(12) United States Patent
Chaudhury et al.

(10) Patent No.: US 8,856,541 B1
(45) Date of Patent: Oct. 7, 2014

(54) LIVENESS DETECTION

(71) Applicant: Google Inc., Mountain View, CA (US)

(72) Inventors: Krishnendu Chaudhury, Sunnyvale, CA (US); Avani Devarasetty, Mountain View, CA (US)

(73) Assignee: Google Inc., Mountain View, CA (US)

( * ) Notice: Subject to any disclaimer, the term of this patent is extended or adjusted under 35 U.S.C. 154(b) by 24 days.

(21) Appl. No.: 13/738,549

(22) Filed: Jan. 10, 2013

(51) Int. Cl.
| | |
|---|---|
| *G06F 21/00* | (2013.01) |
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G06F 7/00* | (2006.01) |
| *G06K 9/00* | (2006.01) |
| *G07C 9/00* | (2006.01) |
| *G06F 21/36* | (2013.01) |
| *G06F 21/32* | (2013.01) |

(52) U.S. Cl.
CPC ............... *G06F 21/36* (2013.01); *G06F 21/32* (2013.01); *G07C 9/00071* (2013.01); *G07C 9/00158* (2013.01)
USPC ................ 713/186; 726/16; 726/21; 382/115

(58) Field of Classification Search
CPC ... G06F 21/32; G07C 9/0071; G07C 9/00158
USPC ...................... 713/186; 726/16–21
See application file for complete search history.

(56) References Cited

U.S. PATENT DOCUMENTS

| | | | | |
|---|---|---|---|---|
| 4,973,149 A | * | 11/1990 | Hutchinson | 351/210 |
| 6,005,984 A | * | 12/1999 | Kawakami et al. | 382/276 |
| 6,152,563 A | * | 11/2000 | Hutchinson et al. | 351/209 |
| 6,285,780 B1 | | 9/2001 | Yamakita et al. | |

(Continued)

FOREIGN PATENT DOCUMENTS

| | | |
|---|---|---|
| KR | 20040048753 A | 6/2004 |
| WO | 2010043771 A1 | 4/2010 |
| WO | 2011042601 A1 | 4/2011 |

OTHER PUBLICATIONS

Asad Ali, Farzin Deravi, and Sanaul Hogue, Liveness Detection using Gaze Collinearity, 2012 Third International Conference on Emerging Security Technologies. Publication Year: 2012 , pp. 62-65.*

(Continued)

*Primary Examiner* — Christopher Revak
*Assistant Examiner* — Jason C Chiang
(74) *Attorney, Agent, or Firm* — Shumaker & Sieffert, P.A.

(57) ABSTRACT

In general, liveness detection techniques are described for facial recognition. The techniques enable potential detection and mitigation of attempts to authenticate by spoofing. An example method includes determining, by a computing device, a challenge pattern against which to match an authentication input to detect liveness, and displaying, using a display device, a graphical user interface (GUI) including an element and moving the element according to the challenge pattern within the GUI. The method further includes receiving, from an image capture device, at least a first image of a face and a second image of the face, and detecting one or more eye movements based on the first and second images of the face. The method further includes determining whether to deny authentication with respect to accessing one or more functionalities controlled by the computing device.

19 Claims, 6 Drawing Sheets

(56) References Cited

U.S. PATENT DOCUMENTS

| | | |
|---|---|---|
| 6,301,370 B1 | 10/2001 | Steffens et al. |
| 6,381,345 B1 | 4/2002 | Swain |
| 6,801,640 B1 | 10/2004 | Okubo et al. |
| 6,829,384 B2 | 12/2004 | Schneiderman et al. |
| 6,873,714 B2 | 3/2005 | Witt et al. |
| 6,947,579 B2 | 9/2005 | Bronstein et al. |
| 7,027,617 B1* | 4/2006 | Frischholz .................... 382/107 |
| 7,127,087 B2 | 10/2006 | Huang et al. |
| 7,158,097 B2 | 1/2007 | Taylor et al. |
| 7,194,114 B2 | 3/2007 | Schneiderman |
| 7,406,212 B2* | 7/2008 | Mohamed et al. ............ 382/281 |
| 7,421,097 B2 | 9/2008 | Hamza et al. |
| 7,542,591 B2* | 6/2009 | Li .................................. 382/118 |
| 7,715,599 B2 | 5/2010 | Hiraizumi et al. |
| 7,755,619 B2 | 7/2010 | Wang et al. |
| 7,848,566 B2 | 12/2010 | Schneiderman |
| 7,929,734 B2* | 4/2011 | Jung et al. ..................... 382/117 |
| 7,986,816 B1* | 7/2011 | Hoanca et al. ................ 382/115 |
| 7,997,730 B2* | 8/2011 | Cleveland .................... 351/210 |
| 8,016,770 B2* | 9/2011 | Chiba et al. .................. 600/558 |
| 8,064,688 B2 | 11/2011 | Schneiderman |
| 8,184,867 B2* | 5/2012 | Otto et al. ..................... 382/117 |
| 8,185,646 B2 | 5/2012 | Headley |
| 8,249,361 B1 | 8/2012 | Steffens |
| 8,254,647 B1 | 8/2012 | Nechyba et al. |
| 8,259,169 B2* | 9/2012 | Sugio et al. ..................... 348/78 |
| 8,284,019 B2 | 10/2012 | Pishva |
| 8,290,220 B2* | 10/2012 | Uchida ......................... 382/118 |
| 8,437,513 B1* | 5/2013 | Derakhshani et al. ........ 382/115 |
| 2005/0212654 A1 | 9/2005 | Yoda |
| 2006/0026427 A1 | 2/2006 | Jefferson |
| 2007/0092115 A1* | 4/2007 | Usher et al. ................... 382/117 |
| 2007/0253604 A1 | 11/2007 | Inoue et al. |
| 2007/0291998 A1 | 12/2007 | Takizawa et al. |
| 2008/0080748 A1 | 4/2008 | Sukegawa et al. |
| 2008/0247611 A1 | 10/2008 | Aisaka et al. |
| 2008/0285801 A1 | 11/2008 | Heinzmann et al. |
| 2009/0067681 A1 | 3/2009 | Michaeli |
| 2009/0232363 A1 | 9/2009 | Ohashi et al. |
| 2009/0252383 A1 | 10/2009 | Adam et al. |
| 2010/0074479 A1 | 3/2010 | Chou et al. |
| 2010/0135541 A1 | 6/2010 | Lai et al. |
| 2010/0246906 A1 | 9/2010 | Lovell et al. |
| 2010/0296706 A1* | 11/2010 | Kaneda et al. ................ 382/118 |
| 2010/0310133 A1 | 12/2010 | Mason et al. |
| 2011/0188712 A1 | 8/2011 | Yoo et al. |
| 2012/0075452 A1 | 3/2012 | Ferren |
| 2012/0169860 A1* | 7/2012 | Lian et al. ....................... 348/77 |
| 2012/0213418 A1* | 8/2012 | Tosa et al. ..................... 382/117 |
| 2013/0005443 A1* | 1/2013 | Kosta et al. ..................... 463/25 |

OTHER PUBLICATIONS

Leptonica: An open source C library for efficient image processing and image analysis operations, Leptonica Library, found at http://code.google.com/p/leptonica/, accessed Jan. 3, 2013, 2 pp.

Dalal et al., "Histogram of Oriented Gradients for Human Detection," pp. 886-893, IEEE Conference on Computer Vision and Pattern Recognition, San Diego, CA, USA, Jun. 2005.

Brian, "Can Android's new 'Face Unlock feature be hacked using a photo? Google says no", The next Web, retrieved at http://thenextweb.com/google/2011/10/20/can-androids-new-face-unlock-feature-be-hacked-using-a-photo-google-says-no/, Oct. 20, 2011, 1 p.

Visidon, "Face Recognition," retrieved from http://www.visidon.fi/en/Face_Recognition, accessed on May 18, 2012, 2 pp.

U.S. Appl. No. 13/533,682, by Steven James Ross, filed Jun. 26, 2012.

U.S. Appl. No. 13/738,744, by Steven James Ross, filed Jan. 10, 2013.

U.S. Appl. No. 13/524,745, by Michael Christian Nechyba, filed Jun. 15, 2012.

U.S. Appl. No. 13/533,723, by Yong Zhao, filed Jun. 26, 2012.

U.S. Appl. No. 13/533,834, by Michael Christian Nechyba, filed Jun. 26, 2012.

"K-nearest neighbors algorithm," Retrieved from http://en.wikipedia.org/wiki/K-nearest_neighbors_algorithm, accessed on Apr. 21, 2013, 8 pp.

* cited by examiner

LIVENESS DETECTION

BACKGROUND

A user may activate or otherwise gain access to functionalities controlled by a computing device by "unlocking" the device. In some instances, a computing device may be configured to permit unlocking based on authentication information provided by the user. Authentication information may take various forms, including alphanumeric passcodes and biometric information. Examples of biometric information include fingerprints, retina scans, and facial images. A computing device may authenticate a facial image input using facial recognition technology.

SUMMARY

In one example, a method includes determining, by a computing device, a challenge pattern against which to match an authentication input to detect liveness, displaying, using a display device coupled to the computing device, a graphical user interface including an element, and moving the element according to the challenge pattern within the graphical user interface. The method may further include receiving, from an image capture device coupled to the computing device, at least a first image of a face of a user and a second image of the face of the user, and detecting, by the computing device, one or more eye movements based at least in part on the first image of the face of the user and the second image of the face of the user. The method may further include determining whether to deny authentication to the user with respect to accessing one or more functionalities controlled by the computing device.

In another example, a computer-readable storage device is encoded with instructions that, when executed, cause one or more programmable processors of a computing device to perform operations including determining a challenge pattern against which to match an authentication input to detect liveness, displaying, using a display device coupled to the computing device, a graphical user interface including an element, and moving the element according to the challenge pattern within the graphical user interface. The operations further include receiving, from an image capture device coupled to the computing device, at least a first image of a face of a user and a second image of the face of the user, and detecting one or more eye movements based at least in part on the first image of the face of the user and the second image of the face of the user. The operations further include determining whether to deny authentication to the user with respect to accessing one or more functionalities controlled by the computing device.

In another example, a computing device includes a memory and one or more programmable processors. The programmable processor(s) are configured to determine a challenge pattern against which to match an authentication input to detect liveness, display, using a display device coupled to the computing device, a graphical user interface including a GUI element, and move the element according to the challenge pattern within the graphical user interface. The programmable processor(s) are further configured to receive, from an image capture device coupled to the computing device, at least a first image of a face of a user and a second image of the face of the user, and detect one or more eye movements based at least in part on the first image of the face of the user and the second image of the face of the user. The programmable processor(s) are further configured to determine whether to deny authentication to the user with respect to accessing one or more functionalities controlled by the computing device.

In one example, a method includes determining, by a computing device, a challenge pattern against which to match an authentication input to detect liveness, displaying, using a display device coupled to the computing device, a graphical user interface including an element, and displaying the graphical user interface such that the GUI element moves according to the challenge pattern within the graphical user interface. The method may further include receiving, from an image capture device coupled to the computing device, at least a first image of a face of a user and a second image of the face of the user, and detecting, by the computing device, one or more eye movements based at least in part on the first image of the face of the user and the second image of the face of the user. The method may further include comparing, by the computing device, the detected one or more eye movements to the challenge pattern determined for liveness detection purposes, and determining, based at least in part on the comparison, whether to deny authentication to the user with respect to accessing one or more functionalities controlled by the computing device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
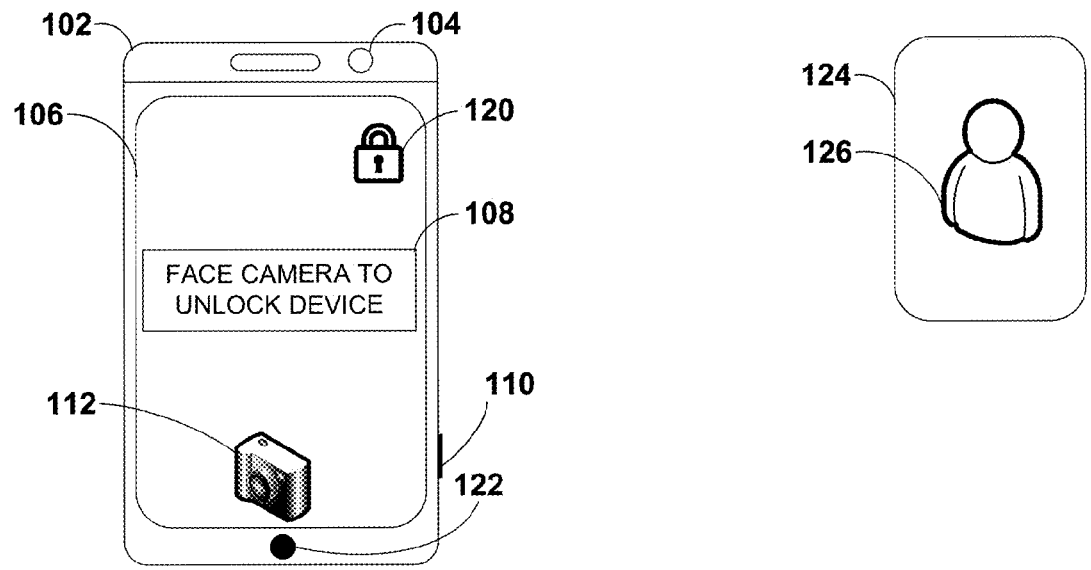
FIG. 1A illustrates a computing device that can capture facial images associated with a user, analyze the captured facial image for possible spoofing, and determine whether to allow or deny authentication based on the analysis, in accordance with one or more aspects of this disclosure.

A computing device may use facial recognition programs in various scenarios. For example, a computing device may use facial recognition programs to authenticate a user who attempts to gain access to one or more functionalities of the computing device or functionalities otherwise controlled by the computing device. In some common scenarios, a computing device may store images of the faces of one or more authorized users (or "enrollment images"). When a user attempts to gain access to functionalities of the computing device (e.g., by "unlocking" the device), the computing device may capture an image of the user's face for authentication purposes. The computing device may then use facial recognition programs to compare the captured facial image to the enrollment images associated with authorized users. If the facial recognition programs determine an acceptable level of match between the captured facial image and at least one enrollment image, the computing device may authenticate the user, and grant the unlock request.

Unauthorized users may leverage vulnerabilities of facial recognition programs to cause erroneous authentication. For example, an unauthorized user may attempt to unlock a computing device using "playback" or "spoofing" techniques. To cause erroneous authentication by spoofing, an unauthorized user may present a facial image of an authorized user for capture by the computing device. For example, an unauthorized user may present to the device a printed picture of the authorized user's face or obtain a video or digital image of an authorized user on a second computing device (e.g., by pulling up an authorized user's profile picture from a social networking website). Thus, an unauthorized user may attempt to use spoofing methods to gain access to functionalities of the computing device to overcome authentication constraints otherwise implemented by the computing device.

In general, this disclosure is directed to techniques for preventing erroneous authentication caused by spoofing attempts. A computing device may implement one or more anti-spoofing (or anti-playback) programs that detect suspected spoofing attempts, and prevent erroneous authentication due to the spoofing attempts. In some examples, the anti-spoofing techniques may include capturing multiple facial images of a user, and analyzing the facial images for indications of liveness. Liveness may be indicated by various gestures, such as movement of the eyes. In accordance with the techniques of this disclosure, the anti-spoofing programs may, in various implementations, detect eye movements and compare the nature of the detected eye movements to a predetermined set of movements. At various instances, the term "liveliness" may be used in place of "liveness." For purposes of this disclosure, the terms "liveliness" and "liveness" may be considered synonymous and may be used interchangeably. More specifically, the terms "liveness" and "liveliness" may each be used herein to denote the distinction between an inanimate object (e.g., an image or other likeness used for spoofing) and a live person. Additionally, in some implementations, the computing device may determine liveness based solely on eye movement detection, and not compare the eye movements to the pattern (or disregard results of the comparison).

In some examples, the detection and comparison of eye movements may be referred to herein as "gaze tracking." For instance, the anti-spoofing programs may cause a computing device to display a moving element (such as a dot, icon, etc.) at a graphical user interface (GUI) provided by the computing device. Additionally, the anti-spoofing programs may detect characteristics of the eye movements, and use the characteristics to compare the eye movements to an expected eye movement pattern that is based on the predetermined movement of the moving GUI element. As some examples, the anti-spoofing programs may compare the number of eye movements, the direction and/or speed of the eye movements, durations of pauses between different eye movements, and others. In various implementations, the anti-spoofing programs may allow a lag time between movements of the GUI element and detecting the corresponding eye movements, to accommodate delays caused by processing, communication, and human limitations. Based on the detection, tracking, and adequate matching of eye movements, the anti-spoofing programs may transition the computing device from a locked state to an unlocked state. The anti-spoofing programs may prevent access to functionalities controlled by the computing device when eye movements are not detected and/or tracked, or when eye movements do not adequately match the predetermined eye movement parameters.

The anti-spoofing programs may provide one or more advantages, such as reduced chances of an unauthorized user causing erroneous authentication by spoofing attempts. For example, the anti-spoofing programs may cause the facial recognition programs to deny authentication to a user when the computing device does not detect or track eye movements in a series of captured facial images, when tracked eye movements do not match movement predetermined eye movement parameters, etc. In some implementations, the anti-spoofing programs may detect other indications of liveness in addition to the tracked eye movements. For example, the anti-spoofing programs may implement one or more of speaker identification (e.g., using voice recognition technology) and speech recognition to supplement the gaze tracking functionalities described above. For example, the anti-spoofing programs may select one or more words from a lexicon, and prompt a user to speak the selected word(s). The anti-spoofing programs may match the detected spoken word(s) to the selected word(s) using speech recognition. Additionally, in some implementations, the anti-spoofing programs may use voice recognition technology to match the voice of the speaker to the voice of an authorized user (e.g., as indicated by the voice of an enrollment speech sample). In this manner, techniques of the present disclosure may reduce the occurrence of erroneous authentication caused by spoofing attempts.

Figure 1B:
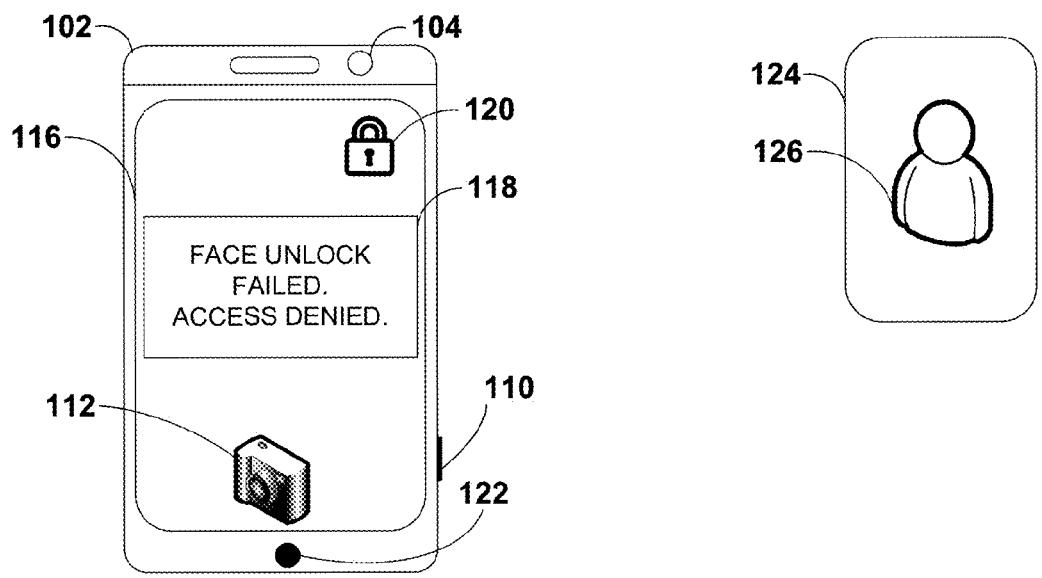
FIG. 1B is a conceptual diagram illustrating an example state of the computing device of FIG. 1A after the computing device detects an attempt to cause erroneous authentication by spoofing, in accordance with one or more aspects of this disclosure.

FIGS. 1A-1B are conceptual diagrams illustrating an example computing device that detects possible spoofing in captured facial images, in accordance with one or more aspects of the present disclosure. FIG. 1A illustrates computing device 102 that may capture facial images associated with a user (e.g., authorized user 126), analyze the captured facial image for possible spoofing, and determine whether to allow or deny authentication based on the analysis. Computing device 102 may include, be, or be part of one or more of a variety of types of devices, such as a mobile phone (including a smartphone), tablet computer, netbook, laptop, desktop, personal digital assistant ("PDA"), set-top box, television, biometric door lock, watch, vehicle ignition, and presence verification device, among others.

Computing device 102 may include camera lens 104. In the example of FIG. 1A, camera lens 104 may be part of or coupled to a front-facing camera of computing device 102. In other examples, camera lens 104 may be part of or coupled to a rear-facing camera of computing device 102. One or both of the front-facing and rear-facing cameras may be capable of capturing still images, video, or both. In still other examples, camera lens 104 may be integrated with other devices, such as a flashbulb, to form a single component of computing device 102.

In the example of FIG. 1A, computing device 102 may include a display device that displays graphical user interface (GUI) 106. GUI 106 may be displayed by a variety of display devices, including input/output capable devices such as a touchscreen or presence-sensitive display. As shown in the example of FIG. 1A, GUI 106 may include one or more GUI elements, such as lock indicator 120, unlock prompt 108, and capture icon 112.

Computing device 102 may be configured to operate in a "locked" mode, shown by lock indicator 120. In some examples, a user may actively configure computing device 102 to operate in locked mode. For example, a user may press a button (such as button 110) for a predetermined length of time to configure computing device 102 to operate in locked mode. In these and other examples, a user may tap, swipe, or otherwise interact with one or more elements of GUI 106, using an input/output capable display of computing device 102. Computing device 102 may also be configured to operate in locked mode by passive means. For example, a predetermined period of "inactivity" may configure computing device 102 to operate in locked mode. Inactivity may occur due to an absence of user interaction (e.g., through button presses, contact with an input/output capable display device, etc.). The predetermined time period that configures computing device 102 to operate in locked mode may be a default time period specified by a manufacturer of computing device 102, or may be programmed by an authorized user, such as authorized user 126.

In some examples, computing device 102 may utilize facial recognition technology to stop operation in locked mode. In other words, authorized user 126 may "unlock" computing device 102 by authentication methods that use facial recognition techniques to determine whether authorized user 126 is an authorized user of device 102. More specifically, authorized user 126 may set up a facial recognition application or embedded process of computing device 102 by storing an enrollment image that represents the face of authorized user 126. Authorized user 126 may cause a camera of computing device 102 to capture the authentication using camera lens 104. Computing device 102 may store the enrollment image to one or more storage devices of computing device 102, and/or to a remote location, commonly known as "cloud storage."

To unlock computing device 102 using facial recognition technology, a user (such as authorized user 126) may provide an authentication image that represents at least a portion of his/her face. In some examples, the user may actively cause a camera of computing device 102 to capture the authentication image. For example, the user may face camera lens 104 and press button 110 to cause the camera to capture the authentication image. In another example, the user may tap, swipe, or otherwise interact with an area associated with capture icon 112 included in GUI 106. In still other examples, computing device 102 may automatically capture the authentication image in response to the user facing camera lens 104. As shown in the example of FIG. 1A, computing device 102 may display GUI 106 to include unlock prompt 108. In this example, unlock prompt 108 indicates that the user may simply face a camera, which may include or be otherwise coupled to camera lens 104, to cause computing device 102 to capture the authentication image. For example, when the user faces camera lens 104, computing device 102 may use a facial recognition program to determine that the image currently captured through camera lens 104 includes a representation of a human face.

Computing device 102 may then compare the captured authentication image with the enrollment image, and determine whether or not the images are sufficiently similar to each other for facial recognition purposes. For example, computing device 102 may utilize one or more facial recognition programs to compare metrics associated with the authentication image to metrics associated with the enrollment image. Some examples of metrics may include distances between facial elements (pupil-to-pupil, mouth width, etc.), contours of various facial features, pixilation corresponding to skin tone or texture, hair and/or eye color, and many others. Facial recognition programs running on computing device 102 may perform the comparison using one or more recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, to name just a few. Based on comparison-based values, such as preprogrammed acceptable margins of error, facial recognition programs running on computing device 102 may determine whether or not the authentication image and the enrollment image are sufficiently similar to one another for facial recognition. In instances where the facial recognition programs grant a match, the user may successfully unlock computing device 102. Conversely, if the facial recognition programs deny a match, the user may be unable to unlock computing device 102, and computing device 102 may continue to operate in locked mode.

However, an unauthorized user may exploit vulnerabilities of commonly used facial recognition technologies to gain access to unlock computing device 102. For example, if an unauthorized user gains possession of computing device 102 while computing device 102 is configured in locked mode, the unauthorized user may attempt to unlock computing device 102, as solicited by unlock prompt 108. To successfully authenticate, the unauthorized user may spoof one or more facial recognition programs running on computing device 102 by presenting image 124, which includes a visual representation of authorized user 126. Image 124 may take various forms, such as a still photo in printed form, still photo in digital form, or one or more frames of a video. In one example where image 124 is a digital still photo, the unauthorized user may invoke image 124 using a second computing device (not shown for purposes of ease of illustration). For example, the unauthorized user may use the Internet to access a profile picture that authorized user 126 posted to a social networking website. Using image 124, an unauthorized user may attempt to spoof the facial recognition programs running on computing device 102 and illicitly unlock computing device 102.

Computing device 102 may implement techniques of this disclosure to detect attempts to spoof the facial recognition programs using image 124. In some implementations, to determine whether or not an object of a facial image captured using a camera of computing device 102 is a live person, computing device 102 may detect whether a series of facial images display a movement of the eyes. For instance, computing device 102 may use the front-facing camera coupled to camera lens 104 to capture video data corresponding to the object of the captured facial image. In turn, computing device 102 may implement the anti-spoofing techniques of this disclosure to detect one or more eye movements based on the captured video.

For example, computing device 102 may extract distinct frames of the captured video data, and utilize the frames as a first image, second image, and so on of the face of the user. Additionally, computing device 102 may classify, or "bucket," the images based on a detected gaze displayed in each image. For example, if a user's eyes face substantially forward (e.g., looking directly at camera lens 104), computing device 102 may classify such a frame as an image that exhibits a "center-gaze." At various instances in the present disclosure, such a frame/image may also be described as "center-gazing" or "forward-gazing."

In contrast, if a subsequent frame of the video (e.g., the second image of the face of the user) displays the user's eyes turned towards the user's left side, computing device 102 may classify the subsequent frame as a "left-gaze" image. Similarly, if another frame of the video (e.g., a third image of the face of the user) displays the user's eyes turned towards the user's right side, computing device 120 may classify the frame as a "right-gaze" image. In the examples described above, computing device 120 may implement a binary classification method. For instance, computing device 102 may assign a value of '1' pertaining to a center-gaze classification if a corresponding frame displays the user's eyes facing directly forward. In this example, computing device 102 may assign a value of '0' to the left-gaze and right-gaze classifications with respect to the frame. Although the techniques of this disclosure are described largely with respect to binary classifications herein, it will be appreciated that devices, such as computing device 102, may alternatively or additionally implement the techniques using other classification methods known in the art.

Based on differences in the classification of various frames of the captured video, computing device 102 may detect one or more eye movements performed by the user. For example, if a first image (e.g., an early frame of the video) falls under a center-gaze classification, while a second image (e.g., a frame that is subsequent to the early frame) falls under a left-gaze classification, computing device 102 may detect that the user has moved his/her eyes to the left. Similarly, if a third image (e.g., a frame that is subsequent to the two frames described above) is classified as a right-gaze image, computing device 102 may detect that the user has moved his/her eyes to the right, subsequent to the left-movement described above. It will be appreciated that, in some implementations, the anti-spoofing programs running on computing device 102 may determine liveness based solely on detecting the eye movement(s). In this manner, computing device 102 may implement the techniques of this disclosure to detect individual eye movements, as well as particular combinations and/or sequences of eye movements.

In some implementations, computing device 102 may implement techniques of this disclosure to detect a particular eye movement or a particular set/sequence of eye movements in order to establish liveness for the purpose of authentication by facial recognition. For instance, computing device 102 may generate (e.g., using a random combination generator), a distinct sequence of eye movements (or a "challenge pattern") for the user to perform. In turn, computing device may detect the sequence of eye movements performed by the user attempting to authenticate and match the detected sequence of eye movements to the challenge pattern. By matching the detected sequence of eye movements to the challenge pattern, computing device 102 may detect spoofing attempts in which an unauthorized user utilizes a video recording of an authorized user moving his/her eyes. In this manner, techniques of this disclosure may enable computing device 102 to implement anti-spoofing measures in a robust manner.

In examples, computing device 102 may display, as part of GUI 106, one or more elements that instruct the user to perform the challenge pattern. In one implementation, computing device 102 may display, in conjunction with unlock prompt 108 or subsequent to removing unlock prompt 108, instructions for performing the challenge pattern. In other implementations, computing device 102 may display a "challenge dot" that moves along GUI 106 according to challenge pattern. As one example, the challenge pattern may include the following sequence of transitions:

(i) center gaze to a left gaze,
  (ii) left gaze back to center gaze, and
  (iii) center gaze to right gaze.

In this example, computing device may cause the challenge dot to move along a straight line path, such as a horizontal axis (e.g., a line positioned parallel to a horizontal edge) of GUI 106, from a horizontal middle, towards a left direction, back to the horizontal middle, and towards a right direction. Movements to the left and/or right may entail stopping the challenge dot at an edge of GUI 106, at an edge of a virtual box displayed as part of GUI 106, and others. While described largely herein with respect to movement along a horizontal axis for purposes of clarity only, it will be appreciated that computing device 102 may move the challenge dot in any combination of directions and/or angles within GUI 102 in accordance with the techniques of this disclosure.

In some such implementations, computing device 102 may utilize additional parameters in generating the challenge pattern and matching it to the detected sequence of eye movements. For example, the anti-spoofing programs executing on computing device 102 may vary the speed of the challenge dot with respect to various eye movements of the challenge pattern. In the example eye movement pattern described above, the anti-spoofing programs may move the challenge dot from middle to left at a first speed, and move the challenge dot back from left to middle at a second, slower speed. In contrast, the anti-spoofing programs may move the challenge dot from middle to right at a third speed that is faster than both the first speed. By comparing the speed of each detected eye movement with the speed of the corresponding movement of the challenge dot, the anti-spoofing programs may determine whether a live user is following the speed parameters of the challenge pattern.

Another example parameter that the anti-spoofing programs may incorporate into the challenge pattern is a "stop time." More specifically, the anti-spoofing programs may stop the challenge dot at various positions for various lengths of time. For instance, the anti-spoofing programs may stop the challenge dot at the left edge for a period of ten seconds, and at the right edge for three seconds (along with stops of varying lengths at the horizontal middle). In turn, the anti-spoofing programs may compare gaze times associated with the corresponding left gaze and right gaze to the stop times. Based on whether the gaze times match the stop times, the anti-spoofing programs may determine whether a live user is performing the particular challenge pattern. In this manner, computing device 102 may implement anti-spoofing techniques of this disclosure to incorporate a variety of parameters into liveness detection, thereby creating a robust environment for determining the authenticity of facial recognition input.

In some examples where computing device 102 receives the images as frames of video data, the anti-spoofing programs may select one or more frames from the captured video, and use the selected frames for analysis of detected eye movements. In various implementations, the anti-spoofing programs may select images corresponding to various gazes specified in the challenge pattern, various checkpoints (e.g., based on elapsed time) within the challenge pattern, etc. By selecting specific images (or frames) from the video data, the anti-spoofing programs may conserve resources that might otherwise be expended for processing unnecessary images. In this manner, the anti-spoofing programs may implement the gaze-tracking techniques of this disclosure to improve efficiency while maintaining accuracy and robustness.

As shown, computing device 102 may also be equipped with microphone 122. Computing device 102, and components thereof may use microphone 122 to receive audio input for various purposes. In some implementations, the anti-spoofing programs running on computing device 102 may supplement the gaze tracking techniques described above with voice recognition and/or speech recognition techniques. As used herein, voice recognition may refer to verifying a user's identity by matching the user's voice against a reference voice. Speech recognition may refer to verifying the content of a user's speech by matching the speech against reference verbal cues, such as predetermined dictionary words. By adding voice- and speech-based authentication to the gaze-tracking techniques, the anti-spoofing programs may be enhanced, offering improved robustness and resistance to erroneous authentication caused by spoofing. Details of voice recognition and speech recognition techniques that may be implemented by computing device 102 are discussed in further detail below with respect to FIG. 2.

FIG. 1B is a conceptual diagram illustrating an example state of computing device 102 after computing device 102 detects an attempt to cause erroneous authentication by spoofing. As discussed, an unauthorized user may attempt to spoof facial recognition programs running on computing device 102 using image 124 that represents authorized user 126. Computing device 102 may implement one or more techniques of this disclosure to detect an attempt to spoof, and deny authentication by facial recognition based on the detection. As shown in FIG. 1B, computing device 102 may display failure notification 118 within modified GUI 116. In this example, failure notification 118 merely indicates that an attempt to authenticate by facial recognition have failed, and that computing device 102 has denied access to a user who attempted to unlock computing device 102 using image 124. In other examples, computing device 102 may display a more detailed notification, such as a notification that identifies spoofing as a suspected reason behind the failure to authenticate.

As described, computing device 102 may use the anti-spoofing programs to detect indications of liveness based on movement of a user's eyes (e.g., through techniques referred to herein as gaze tracking). Based on whether the detected eye movements match the generated challenge pattern, the anti-spoofing programs may detect that the user attempting to authenticate using the facial recognition programs is a live person, or that a user is attempting to authenticate by spoofing. As described, the anti-spoofing programs may compare the detected eye movements to the challenge pattern using various parameters, such as a number, direction(s), speed(s), stop time(s), etc.

Although described largely with respect to unlocking a device, the techniques of this disclosure may be implemented in several different use cases. As some examples, the facial recognition and liveness detection techniques may be implemented on a remote server, to provide access to a user attempting to log in to an email account or social network account. In some instances, the techniques may be implemented as a backup, such as to recover access to an email account after a user has been locked out for failed login attempts, or if the user forgets a username or password. In this manner, the techniques of this disclosure may provide user authentication in a variety of scenarios.

Figure 2:
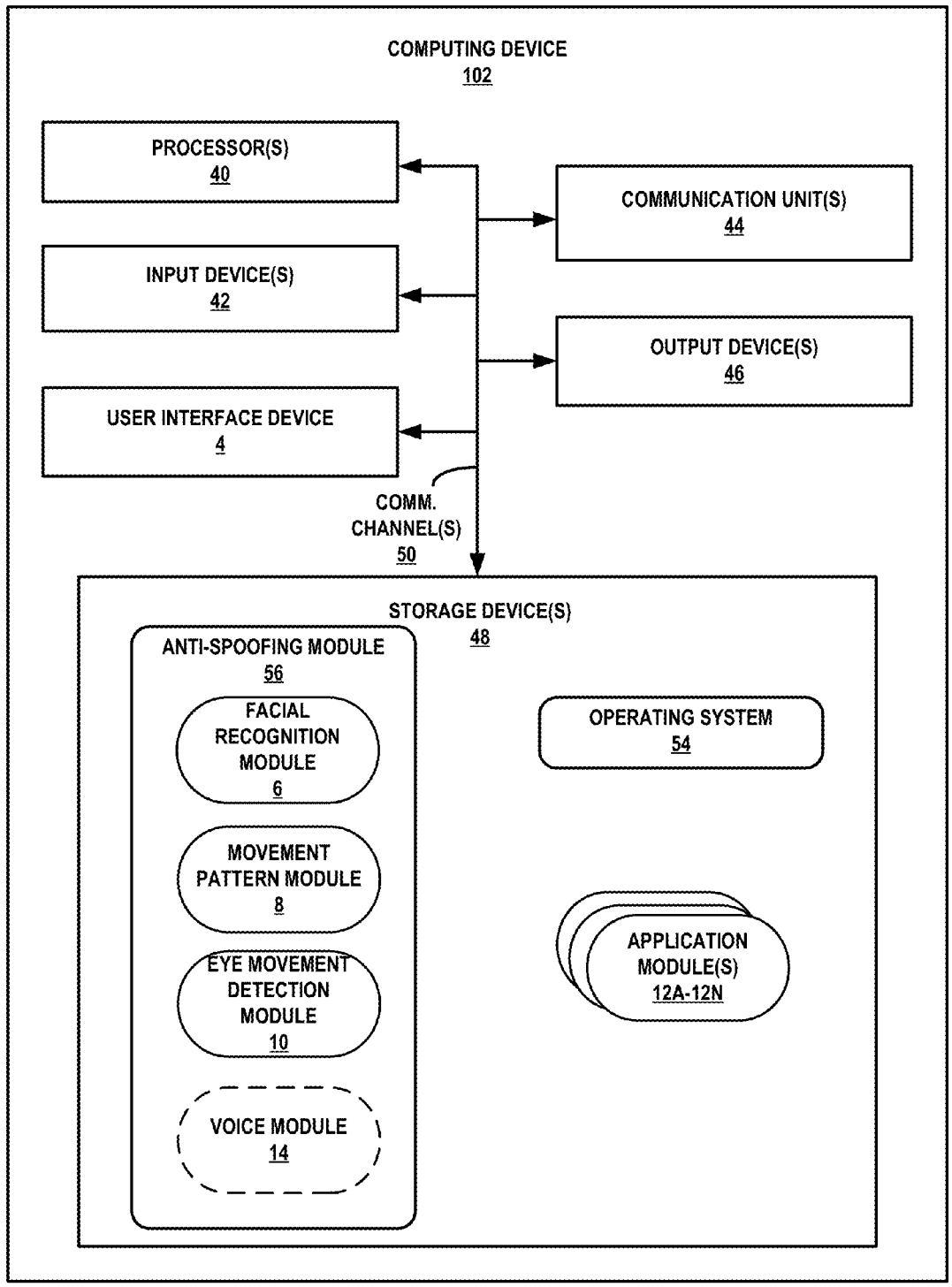
FIG. 2 is a block diagram illustrating details of an example computing device that detects possible spoofing attempts in captured facial images, in accordance with one or more aspects of this disclosure.

FIG. 2 is a block diagram illustrating details of an example computing device for detecting possible spoofing in captured facial images, in accordance with one or more aspects of this disclosure. Computing device 102 of FIG. 2 is one example implementation of computing device 102 illustrated in and described with respect to FIGS. 1A-1B. It will be appreciated that FIG. 2 illustrates only one particular example of computing device 102, and many other examples of computing device 102 may be used in other instances, in accordance with one or more aspects of this disclosure.

As shown in the specific example of FIG. 2, computing device 102 includes one or more processors 40, one or more input devices 42, one or more communication units 44, one or more output devices 46, one or more storage devices 48, and user interface (UI) device 4. Computing device 102, in one example, further includes one or more application modules 12 and operating system 54 that are executable by computing device 102. Each of components 40, 42, 44, 46, and 48 may be interconnected (physically, communicatively, and/or operatively) for inter-component communications. In some examples, communication channels 50 may include a system bus, network connection, inter-process communication data structure, or any other channel for communicating data. As one example in FIG. 2, components 40, 42, 44, 46, and 48 may be coupled by one or more communication channels 50. Application modules 12 and operating system 54 may also communicate information with one another as well as with other components in computing device 102.

Processor(s) 40, in one example, are configured to implement functionality and/or process instructions for execution within computing device 102. For example, processor(s) 40 may be capable of processing instructions stored in storage device(s) 48. Examples of processor(s) 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 102 during operation. Storage device(s) 48, in some examples, are collectively described as a computer-readable storage medium, or as one or more computer-readable storage devices. In some examples, storage device(s) 48 include temporary memory, meaning that a primary purpose of storage device(s) 48 is not long-term storage. Storage device(s) 48, in some examples, are described as a volatile memory, meaning that storage device(s) 48 do not maintain stored contents when the computer is turned off. Examples of volatile memories include random access memories (RAM), dynamic random access memories (DRAM), static random access memories (SRAM), and other forms of volatile memories known in the art. In some examples, storage device(s) 48 are used to store program instructions for execution by processors 40. Storage device(s) 48, in one example, is used by software or applications running on computing device 102 (e.g., application modules 12) to temporarily store information during program execution.

Storage device(s) 48, in some examples, also include one or more computer-readable storage media (or one or more computer-readable storage devices). Storage device(s) 48 may be configured to store larger amounts of information than volatile memory. Storage device(s) 48 may further be configured for long-term storage of information. In some examples, storage device(s) 48 include non-volatile storage elements. Examples of such non-volatile storage elements include magnetic hard discs, optical discs, floppy discs, solid-state discs, flash memories, or forms of electrically programmable memories (EPROM) or electrically erasable and programmable (EEPROM) memories.

Computing device 102, in some examples, also includes one or more communication units 44. Computing device 102, in one example, utilizes communication unit(s) 44 to communicate with external devices via one or more networks, such as one or more wireless networks. Communication unit(s) 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 102 utilizes communication unit(s) 44 to wirelessly communicate with one or more external devices, such as a router or server.

Computing device 102, in one example, also includes one or more input devices 42. Input device(s) 42, in some examples, are configured to receive input from a user through tactile, audio, video, or biometric channels. Examples of input device(s) 42 include a presence-sensitive device (such as a touchscreen), a mouse, a keyboard, a voice responsive system, front- and/or rear-facing cameras (which may be capable of capturing one or both of still images and video data), a microphone, a fingerprint reader, a retina scanner, or any other device capable of detecting an input from a user or other source, and relaying the input to computing device 102, or components thereof.

As shown in FIG. 2, computing device 102 may also include one or more output devices. Output device(s) 46, in some examples, are configured to provide output to a user using tactile, audio, or video stimuli. Output device(s) 46, in various examples, may include a presence-sensitive display (such as a touchscreen display), a sound card, a video graphics adapter card, or any other type of device for converting a signal into an appropriate form understandable to humans or machines. Additional examples of output device(s) 46 include a speaker, a cathode ray tube (CRT) monitor, a liquid crystal display (LCD), a light-emitting diode (LED) display, or any other type of device that can generate intelligible output to a user.

Additionally, computing device 102 may include UI device 4. In various implementations, UI device 4 may be included in input device(s) 42 and/or output device(s) 46. In some examples, UI device 4 may include functionality of one or more of input device(s) 42 and/or of output device(s) 46. Examples of UI device 4 include presence-sensitive devices (such as presence-sensitive displays, including touchscreens).

As shown, computing device 102 may include, or otherwise have access to anti-spoofing module 56. While illustrated in FIG. 2 as being stored on storage device(s) 48, it will appreciated that anti-spoofing module 56 (or one or more components thereof) may be stored to a remote device. In such implementations, computing device 102 may access and implement the remotely-stored functionalities of anti-spoofing module 56 using communication unit(s) 44, e.g., through so-called "cloud computing."

Anti-spoofing module 56 may implement one or more of the techniques described in this disclosure. For example, anti-spoofing module 56 may analyze an authentication image (or video data provided for authentication purposes) captured by a camera of input device(s) 42 for possible spoofing, and cause operating system 54 and/or one or more of application modules 12 to either grant or deny a user's request to proceed with authentication based on the analysis. In various examples, anti-spoofing module 56 may utilize one or more of facial recognition module 6, movement pattern module 8, eye movement detection module 10, and voice module 14 to analyze the authentication image/video to detect possible spoofing attempts.

In the example of FIG. 2, anti-spoofing module 56 includes facial recognition module 6. Facial recognition module 6 may be configured or otherwise operable to grant or deny authentication based on facial recognition analysis. In various examples, the facial recognition analysis may include comparing a captured authentication image (e.g., a still image or a frame of video) to an enrollment image or other representation of an authorized user's face. As described with respect to FIG. 1, facial recognition module 6 may perform the comparison using one or more recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, to name just a few. Based on comparison-based values, such as preprogrammed acceptable margins of error, facial recognition module 6 may determine whether or not the authentication image and the enrollment image are sufficiently similar to one another for facial recognition. In instances where facial recognition module 6 grants a match, the user may successfully gain access to functionalities controlled by computing device 102.

As some examples, the facial recognition match may enable a user to log in to an email account, social networking account, or other user account that requires authentication, unlock a door to a vehicle, room, or safe deposit box communicatively coupled to computing device 102, and others. In various implementations, facial recognition module 6 may be implemented externally to anti-spoofing module 56, such as within operating system 54 or as one or more of application modules 12.

Movement pattern module 8 may generate an eye movement pattern against which to compare one or more eye detected eye movements performed by a user during an authentication process. In various implementations, movement pattern module 8 may generate a challenge pattern at each authentication attempt. By generating a distinct challenge pattern at each authentication attempt, movement pattern module 8 may reduce the chances of a malicious user spoofing facial recognition module 6 using a prior recording of an authorized user performing a standard eye movement pattern. To generate a distinct pattern at each authentication attempt, movement pattern module may use one or more randomizer algorithms. Additionally, movement pattern module 8 may generate patterns conforming to various 2-dimensional paths along UI device 4, such as a horizontal line that runs in parallel to a horizontal edge of UI device 4.

In addition, movement pattern module 8 may display (e.g., at UI device 4), one or more GUI elements that move according to the challenge pattern. For instance, movement pattern module 8 may display a challenge dot within a GUI displayed at UI device 4. In turn, movement pattern module 8 may move the challenge dot within the GUI (e.g., along the horizontal line) to conform to various characteristics of the challenge pattern, such as directions, speeds, and stop times/locations.

As shown in FIG. 2, anti-spoofing module 56 may also include eye movement detection module 10. Eye movement detection module 10 may be configured or otherwise operable to detect and analyze one or more eye movements captured by input device(s) 42. For instance, eye movement detection module 10 may detect and analyze characteristics of the eye movement(s), such as speed, direction, and stop times/locations. In turn, eye movement detection module 10 may compare the detected eye movement(s) to an expected eye movement pattern based on the challenge pattern generated by movement pattern module 8. Based on whether the detected eye movement(s) exhibit sufficient similarity (e.g., within a preset margin of error) to the expected eye movement pattern, eye movement detection module 10 may determine whether the authentication attempt is spoof-based. In some implementations, eye movement detection module 10 may determine liveness based solely on detecting the eye movement(s), and not compare the detected eye movement(s) to the challenge pattern.

Additionally, anti-spoofing module 56 and its components may implement a margin-of-error allowance for various comparisons, such as the speed and stop time comparisons described above. By including the margin-of-error allowance, anti-spoofing module 56 and components thereof may permit for human error and/or common human delay in responding to stimuli, such as movement of the challenge dot along a GUI displayed at UI device 4. The usage of challenge dot through display within a GUI is described in more detail with respect to FIGS. 3A & 3B below.

In some examples, anti-spoofing module 56 may implement the functionalities of facial recognition module 6 programs periodically within video data captured by a video-capable camera of input devices 42. As some examples, anti-spoofing module 56 may implement the functionalities of facial recognition module 6 at frame-based intervals (e.g., at every third frame of the captured video) and/or at time-based intervals (e.g., at every five seconds of the captured video). By implementing the functionalities of facial recognition module 6 on such a continual basis, anti-spoofing module 56 may detect spoofing attempts in which a malicious user performs the expected eye movement pattern, as prompted, and then uses a spoof-based image or video to authenticate via the facial recognition programs. Implementing the functionalities of facial recognition module 6 on a continual basis may also enable anti-spoofing module 56 to detect scenarios in which multiple users' faces are captured during in the video.

Additionally, facial recognition module 6 may incorporate features of the eyes (e.g., color, iris size, and others) into the implemented facial recognition algorithm(s), thereby denying authentication in scenarios where a malicious user simulates eye movements by manipulating a spoof-based image or video. That is, facial recognition module 6 may be configured to match on features of the eyes, and if these features do not match this can be taken into account by anti-spoofing module 56. In this manner, anti-spoofing module 56 may implement the functionalities of eye movement detection module 10 and of facial recognition module 6 in conjunction with one another to provide a robust system that detects spoofing attempts and rejects erroneous authentication by facial recognition caused by spoofing.

Anti-spoofing module 56 and components thereof may perform the anti-spoofing techniques described herein in a variety of ways. In some implementations, eye movement detection module 10 may extract sub-images from frames of the captured video, such that each extracted sub-image includes all or a substantial portion of the representation of an eye. Additionally, eye movement detection module 10 may divide each extracted sub-image into a grid of smaller fragments (e.g., each fragment may be a quadrilateral, such as a rectangle or square, and may be of the same or varying dimensions). As one example, eye movement detection module 10 may divide an eye (or "ocular") sub-image into an eight-by-eight grid (e.g., a grid that includes a total of 64 fragments arranged to form a square).

In this implementation, eye movement detection module 10 may generate an image histogram for each fragment of the grid. For instance, eye movement detection module 10 may generate each image histogram to represent various pixel-based data, such as a tonal distribution of the respective sub-image fragment. In various examples, the gradients may indicate contrast or color transitions (or "edges") between adjacent pixels of a fragment. A sharp edge may indicate a highly visible color transition, such as the transition between a white pixel and an adjacent black pixel. Conversely, a blunt edge may indicate a less visible color transition, such as the transition between two pixels of different shades of beige. If two adjacent pixels are identical in color, the histogram may express no edge between the two pixels.

In turn, eye movement detection module 10 may generate "votes" corresponding with each edge. The votes may correspond to differing values (such as 1.0 for the sharpest possible edge, and 0.0 for a nonexistent edge). Based on the value associated with each vote, eye movement detection module 10 may categorize (or "bucket") the votes for each fragment. For example, eye movement detection module 10 may generate different categories corresponding to value ranges of votes. Based on the overall count of votes for each category, eye movement detection module 10 may generate a score for each fragment. For instance, a fragment may receive a higher score if the corresponding histogram has a greater number of votes for relatively sharp edges than for relatively blunt edges.

As each histogram corresponds to a particular fragment of the grid, eye movement detection module 10 may generate a score for each fragment of the ocular sub-image. By collecting several scores (e.g., 64 scores in the implementation described above), for the ocular sub-image, eye movement detection module 10 may implement a statistical vote-based system that is robust to errors, such as so-called "noise." For instance, a few erroneous votes (caused by motion blur or other factors) may not have a significant negative effect on the score generated for the ocular sub-image. In this manner, techniques of this disclosure may enable computing device 102 to implement a robust, statistical approach to scoring an ocular sub-image.

As described with respect to FIGS. 1A-1B, eye detection module 10 may extract distinct frames of video data captured by input device(s) 42, and utilize the frames as a first image, second image, and so on of the face of the user. Additionally, eye detection module 10 may classify, or "bucket," the images based on a detected gaze displayed in each image. For example, if a user's eyes face substantially forward (e.g., looking directly at a camera lens of input devices 42), eye detection module 10 may classify such a frame as an image that exhibits a center-gaze.

In contrast, if a subsequent frame of the video (e.g., the second image of the face of the user) displays the user's eyes turned towards the user's left side, eye detection module 10 may classify the subsequent frame as a left-gaze image. Similarly, if another frame of the video (e.g., a third image of the face of the user) displays the user's eyes turned towards the user's right side, eye detection module 10 may classify the frame as a right-gaze image. In these examples, eye detection module 10 may implement a binary classification method. For instance, eye detection module 10 may assign a value of '1' pertaining to a center-gaze classification if a corresponding frame displays the user's eyes facing directly forward. In this example, eye detection module 10 may assign a value of '0' to the left-gaze and right-gaze classifications with respect to the frame. Although the techniques of this disclosure are described largely with respect to binary classifications herein, it will be appreciated that devices and components thereof, such as computing device 102 and eye detection module 10, may alternatively or additionally implement the techniques using other classification methods known in the art.

Based on differences in the classification of various frames of the captured video, eye detection module 10 may detect one or more eye movements performed by the user. For example, if a first image (e.g., an early frame of the video) falls under a center-gaze classification, while a second image (e.g., a frame that is subsequent to the early frame) falls under a left-gaze classification, eye detection module 10 may detect that the user has moved his/her eyes to the left. Similarly, if a third image (e.g., a frame that is subsequent to the two frames described above) is classified as a right-gaze image, eye detection module 10 may detect that the user has moved his/her eyes to the right, subsequent to the left-movement described above. In this manner, eye detection module 10 may implement the techniques of this disclosure to detect individual eye movements, as well as particular combinations and/or sequences of eye movements.

To determine the performance of an eye movement gesture, eye movement detection module 10 may compare the set of histograms for an ocular sub-image to the histograms of an ocular sub-image of a subsequent frame of the captured video. For instance, if a first video frame corresponds to a center gaze, then an ocular sub-image of the frame may include histograms indicating sharp edges in the central portion of the ocular sub-image. In contrast, if a subsequent video frame corresponds to a right gaze, the corresponding histograms may indicate sharp edges in the left portion of an extracted ocular sub-image. Based on the nature of differences (e.g., location) between the histograms of the ocular sub-images, the anti-spoofing programs may detect an eye movement performed by a user.

Anti-spoofing module 56 may also include voice module 14, as illustrated in FIG. 2. Voice module 14 may be configured or otherwise operable to supplement the gaze-tracking techniques implemented by movement pattern module 8 and eye movement detection module 10, in order to prevent or mitigate erroneous authentication caused by spoofing. Voice module 14 is illustrated with a dashed-line border in FIG. 2, to indicate that voice module 14, and its respective functionalities, are optional in the context of anti-spoofing module 56. In some implementations, anti-spoofing module 56 may include voice module 14, but may use one or more functionalities of voice module 14 on an optional basis. For instance, anti-spoofing module 56 may implement the functionalities of voice module 14 in particular scenarios, such as when eye movement detection module 10 determines a near-match, or a match that falls within a quantifiable range, between the detected eye movement(s) and the challenge pattern.

In various implementations, voice module 14 may implement one or both of voice recognition and speech recognition. For instance, voice module 14 may receive, via input device(s) 42, an enrollment voice sample from an authorized user. In turn, voice module 14 may compare authentication voice samples to the enrollment voice, to determine a sufficient match in terms of voice-based characteristics. Voice module 14 may implement various voice recognition techniques known in the art, such as techniques that use or are based on frequency estimation, hidden Markov models, Gaussian mixture models, pattern matching algorithms, neural networks, matrix representation, vector quantization, decision trees, so-called "cohort models," and world models. Using such voice recognition techniques, voice module 14 may implement speaker verification (or authentication) to supplement the facial recognition and gaze-tracking techniques implemented by remaining components of anti-spoofing module 56.

Additionally, voice module 14 may implement various speech recognition techniques. In specific examples, voice module 14 may generate one or more verbal cues (such as randomly selected words or mnemonic devices) at each authentication attempt. In turn, voice module 14 may receive (e.g., via one or more microphones of input devices 42), a speech sample submitted by a user, and determine whether the spoken content of the speech sample exhibits a sufficient match to the verbal cue(s). Voice module 14 may output the verbal cue(s) to the user in a variety of ways, including through displaying text at UI device 4, playing audio representations of the cue(s) through one or more speakers of output device(s) 46, and others. Upon receiving the speech sample submitted by the user, voice module 14 may determine whether the spoken content matches the cue(s) using various speech recognition techniques known in the art, such as techniques based on hidden Markov models, dynamic time warping (DTW)-based speech recognition, and neural networks. By implementing one or both of the voice recognition and speech recognition techniques described herein, voice module 14 may enhance and improve the accuracy of the anti-spoofing techniques implemented by remaining components of anti-spoofing module 56.

Voice module 14 may implement voice recognition as a method of speaker identification. For instance, voice module 14 may receive, via a microphone of input devices 42, an enrollment speech sample from an authorized user. In turn, voice module 14 may match subsequent speech samples against the enrollment speech sample to verify whether a party attempting to authenticate is indeed the authorized user.

In some implementations, voice module 14 may match the content of the speech sample to a word or other verbal cue that is included in a lexicon accessible to computing device 102. This functionality of voice module 14 may be referred to herein as "speech recognition." In some implementations, voice module 14 may generate or select a random verbal cue, such as a dictionary word, and cause computing device 102 to prompt (e.g., via UI device 4) the user to speak the selected verbal cue.

Upon receiving an audio input of the user speaking the verbal cue via the microphone of input devices 42, voice module 14 may compare the voice indicated by the spoken cue to voice indicated by the enrollment speech sample, thereby performing speaker identification. Additionally, voice module 14 may compare the content of the spoken cue to the randomly selected cue. If voice module 14 determines a sufficient match (e.g., a match within a predetermined margin of error) with respect to both speaker identification and speech recognition, then voice module 14 may determine liveness and authenticity with respect to the spoken cue.

In combination with the gaze-tracking functionalities provided by other components of anti-spoofing module 56, the voice- and speech-based liveness detection functionalities provided by voice module 14 may equip computing device 102 with a robust liveness detection scheme. In various implementations, anti-spoofing module 56 and its various components may implement gaze tracking and verbal cue matching either concurrently, or as separate steps. In implementations where anti-spoofing module 56 implements gaze tracking and verbal cue matching concurrently, anti-spoofing module 56 may reduce the amount of time necessary to establish liveness. As one example, anti-spoofing module 56 may complete the liveness detection process within twenty seconds. In implementations where anti-spoofing module 56 implements gaze tracking and verbal cue matching as separate steps, anti-spoofing module 56 may reduce confusion and help coordination of the user, as the user is called upon to perform only one action (namely, either eye movement or speaking) at a given time. In this manner, techniques of this disclosure may provide for various orders of execution, each of which may, in turn, provide various potential advantages.

Figure 3A:
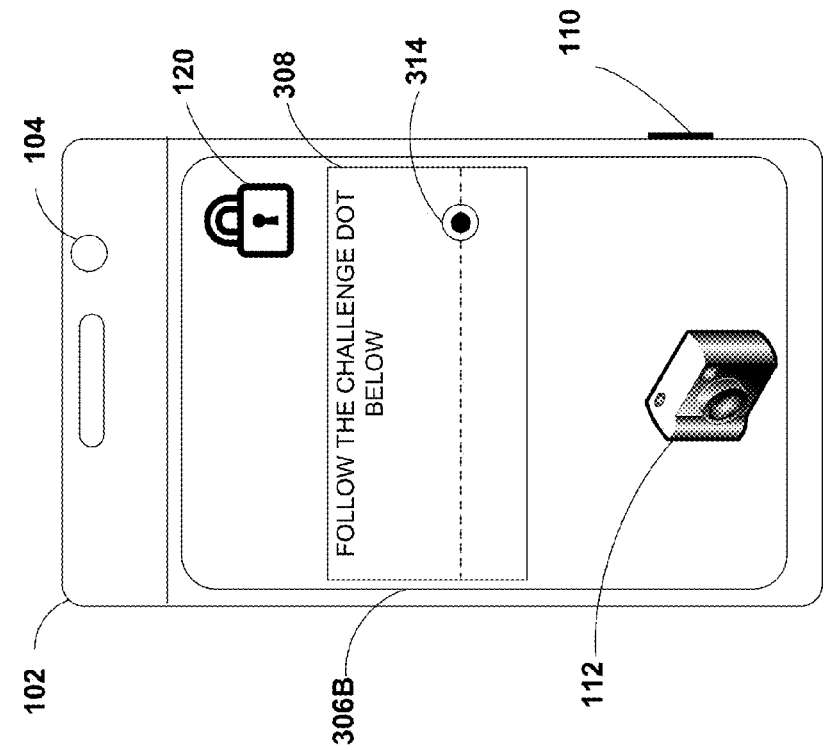
FIGS. 3A-3B are conceptual diagrams illustrating example user interfaces (UIs) that a computing device may display to prompt a user to perform an eye movement pattern, in accordance with one or more aspects of this disclosure.
Figure 3B:
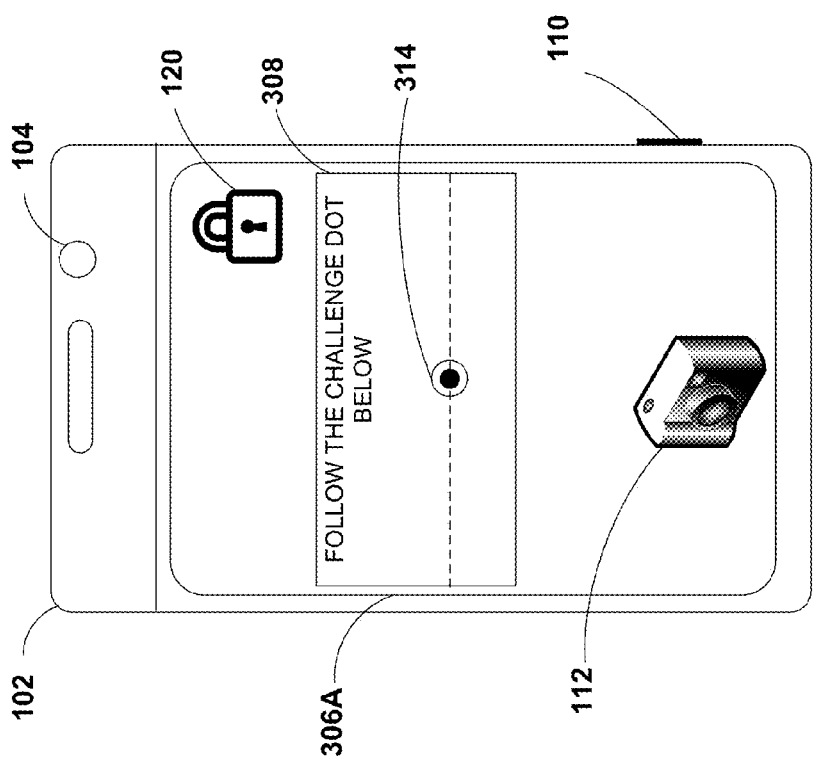

FIGS. 3A-3B are conceptual diagrams illustrating example graphical user interfaces (GUIs) 306A-306B that a computing device may display to prompt a user to perform an eye movement pattern, in accordance with one or more aspects of this disclosure. FIGS. 3A-3B illustrate gaze tracking techniques with respect to computing device 102 described with respect to FIGS. 1A-1B. Several elements of FIGS. 3A-3B are numbered similarly to corresponding elements of FIGS. 1A-1B. Commonly numbered elements of FIGS. 1A-1B and 3A-3B may operate similarly. For ease of discussion, only those elements with different element numbers from FIGS. 1A-1B are described with respect to FIGS. 3A-3B. For purposes of clarity, aspects of FIGS. 3A-3B are described with respect to components of computing device 102 as illustrated in FIG. 2.

As shown in FIG. 3A, GUI 306A may include GUI elements such as pattern display 308. Computing device 102 may output pattern display 308 to communicate, to a user attempting to authenticate, a challenge pattern (e.g., as described with respect to FIGS. 1A, 1B, and 2). In the example of FIGS. 3A-3B, pattern display 308 includes a rectangular GUI element positioned substantially in the vertical middle of respective GUIs 306A and 306B, but it will be appreciated that other appearances and/or locations of pattern display 308 are possible in accordance with one or more aspects of this disclosure.

Pattern display 308 includes one or more sub-elements, such as challenge dot 314. Computing device 102, and/or components thereof, may cause challenge dot 314 to appear to move within GUI 306A according to the challenge pattern generated by movement pattern module 8. In examples, movement pattern module 8 may move challenge dot 314 along a horizontal path (shown as a dotted line within pattern display 308). The movement of challenge dot 314 may conform to the challenge pattern in terms of speeds (of different movements), direction (e.g., either left or right along the horizontal path), and stoppage times and locations (e.g., on the horizontal path).

In turn, computing device 102 may capture multiple images (e.g., as frames of video) using a camera coupled to camera lens 104. By identifying one or both eyes of the user in the captured images, and analyzing the movements of the eye(s), eye movement detection module 10 of anti-spoofing module 56 can determine whether the user has performed the expected eye movement pattern with an acceptable level of accuracy. If eye movement detection module 10 detects that the detected eye movement pattern matches the challenge pattern with a sufficient level of accuracy (and based on the facial recognition programs granting a match to one or more of the images), computing device 102 may authenticate the user, and grant the user access to one or more functionalities controlled by computing device 102. For example, eye movement detection module 10 may be configured with one or more thresholds that provide a guide for a level of accuracy required. It will be appreciated that, in some implementations, the anti-spoofing programs running on computing device 102 may determine liveness based solely on detecting the eye movement(s), and not based on comparing the detected eye movement(s) to the challenge pattern.

FIG. 3B illustrates computing device 102 displaying GUI 306B. GUI 306B includes pattern display 308 with challenge dot 314 positioned at a different location. As shown, in the example of FIG. 3B, challenge dot 314 is positioned at a different location along the horizontal path of pattern display 308 than challenge dot 314 as illustrated in FIG. 3A. The updated position of challenge dot 314 may represent a position of challenge dot 314 during movement or at a stoppage point specified in the challenge pattern. While illustrated with respect to movement along a horizontal straight-line path in FIGS. 3A-3B, it will be appreciated that movement pattern module 8 may generate the challenge pattern to include movement in any number of directions along the 2-dimensional plane of GUIs 306. More specifically, pattern display 308 may include movements of challenge dot 314 to any position within GUIs 306.

Figure 4C:
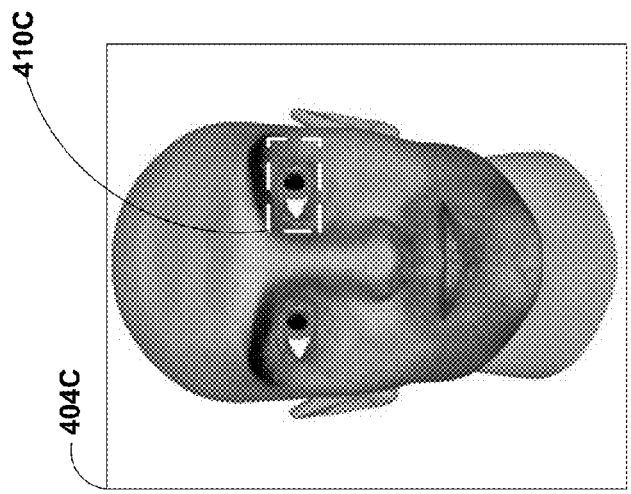
FIGS. 4A-4C are facial images that display center, right, and left gazes, respectively.
Figure 4B:
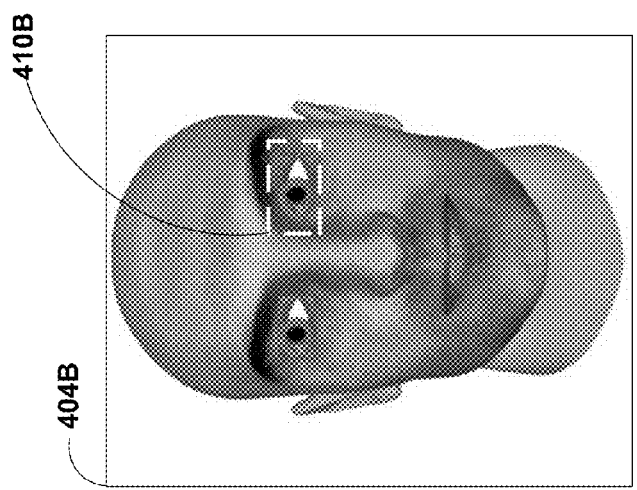
Figure 4A:
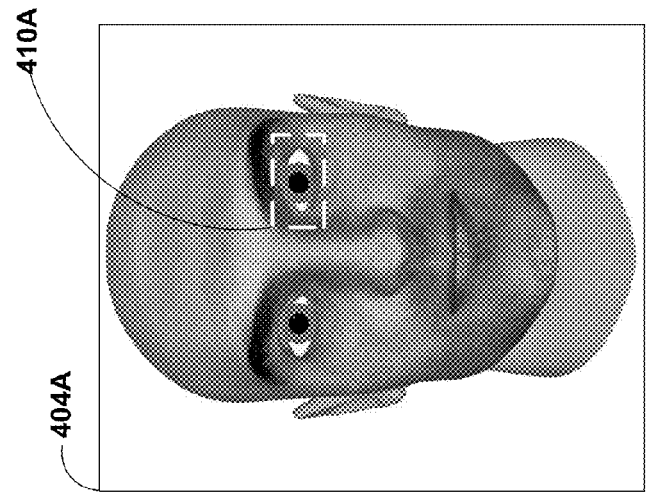

FIGS. 4A-4C are facial images that display center, right, and left gazes, respectively. For instance, FIG. 4A illustrates center-gazing facial image 404A. Similarly, FIG. 4B illustrates right-gazing facial image 404B, and FIG. 4C illustrates left-gazing facial image 404C. For purposes of clarity, aspects of FIGS. 4A-4C are described with respect to components of computing device 102 as illustrated in FIG. 2.

In an example where computing device 102 receives center-gazing facial image 404A as a video frame (e.g., via a video-capable camera of input devices 42), eye movement detection module 10 may extract ocular sub-image 410A for gaze-tracking purposes. Similarly, computing device 102 may receive right-gazing facial image 404B and left-gazing facial image 404C as subsequent frames of the captured video. Accordingly, eye movement detection module 10 may extract ocular sub-images 410B and 410C from right-gazing facial image 404B and left-gazing facial image 404C, respectively.

In some examples, eye movement detection module 10 may extract two ocular sub-images for analysis, i.e., one ocular sub-image for each eye. However, for purposes of clarity, FIGS. 4A-4C are described with respect to analysis of a single ocular sub-image. Eye movement detection module 10 may divide each of ocular sub-images 410A-410C into a grid of rectangular segments (e.g., 8 segments by 8 segments, 5 segments, by 5 segments, 13 segments by 13 segments, or 15 segments by 15 segments). Additionally, eye movement detection module 10 may generate a histogram of gradients (HoG) corresponding to each segment of the respective grids. As described with respect to FIGS. 1A-1B, each HoG may represent pixel transitions (or "edges") associated with the respect segment. In turn, eye movement detection module 10 may categorize the angles indicated in each HoG, with the angles being measured between 0 and 180 degrees. As one example, eye movement detection module 10 may assign the angles to one of three categories: (1) sharp edges, (2) intermediate edges, and (3) blunt edges.

Based on the categorization process, eye movement detection module 10 may garner votes corresponding to the HoGs of each of ocular sub-images 410A-410C. For example, ocular sub-image 410A may generate a high number of votes for sharp edges in its central region. More specifically, because ocular sub-image 410A corresponds to a center gaze, the iris (dark portion) of the eye is positioned in the central region while the sclera (white portion) of the eye is positioned to the left and right portions of ocular sub-image 410A. In turn, the contrast between the iris and the sclera may cause sharper edges in the central portion, thereby generating a high number of votes for sharp edges in the central portion. In contrast, ocular sub-image 410B may generate a high number of votes for sharp edges in the left portion and a high number of votes for blunt edges in the central and right portions, based on the iris being positioned in the left portion. Similarly, ocular sub-image 410C may generate a high number of votes for sharp edges in the right portion and a high number of votes for blunt edges in the central and left portions, based on the iris being positioned in the right portion.

Eye movement detection module 10 may detect differences between ocular sub-images 410A-410C based on the HoG-based votes garnered for each of ocular sub-images 410A-410C. For instance, eye movement detection module 10 may discern the shift of votes for sharp edges moving from the center to the left, then to the right in ocular sub-images 410A-410C. Based on the detected series of shifts, eye movement detection module 10 may detect that a user begins at a center gaze, then moves to a right gaze, and then to a left gaze. Eye movement detection module 10 may also apply additional criteria, such as time between gaze shifts, stoppage times at particular gaze positions, etc. in analyzing the detected eye movements. For instance, in analyzing a stoppage time at a left gaze, eye movement detection module 10 may determine whether a requisite number of frames conform to HoG-based vote count corresponding to left gazing facial image 404C.

Eye movement detection module 10 may generate a HoG for each segment derived from respective ocular sub-images 410A-410C. For instance, eye movement detection module 10 may assign each HoG according to a grid location of the corresponding segment (e.g., "row 2, column 3"). By assigning a unique HoG to each segment of respective ocular sub-images 410A-410C, and garnering several votes for each HoG, eye movement detection module 10 may implement a more robust, increasingly error-resistant classification system. More specifically, by increasing the statistical sampling extracted from each of ocular sub-images 410A-410C, eye movement detection module 10 may implement the classification techniques in such a way that intermittent errors (e.g., erroneous votes) do not significantly impact the overall classification outcome. In this manner, eye movement detection module 10 may implement the techniques of this disclosure in a robust manner that can provide accurate results in spite of certain levels of error (or "noise" caused by erroneous votes).

Based on the votes garnered with respect to each HoG of respective ocular sub-images 410A-410C, eye movement detection module 10 may classify facial images 404A-404C as center gazing, right gazing, and left gazing, respectively. To classify facial images 404A-404C based on characteristics of ocular sub-images 410A-410C, eye movement detection module 10 may use various classification techniques. As one example, eye movement detection module 10 may use the k nearest neighbor (or kNN) classifier system. Details of classifier techniques, including the kNN classifier system, can be found in Pattern Recognition and Machine Learning (Springer, 2006, First Edition, Author Christopher M. Bishop), which is incorporated by reference herein in its entirety.

In addition, eye movement detection module 10 may implement the gaze tracking techniques of this disclosure to account for possible head movements performed by a user. In some examples, users may turn or pan their heads while moving their eyes from side to side. To account for possible head panning during authentication attempts, eye movement detection module 10 may detect and record degrees of head panning at the enrollment stage, and adjust authentication analyses accordingly. In some instances, eye movement detection module 10 may output a notification to a user that a level of head panning was detected, and may cause authentication difficulties at the authentication stage.

Figure 5:
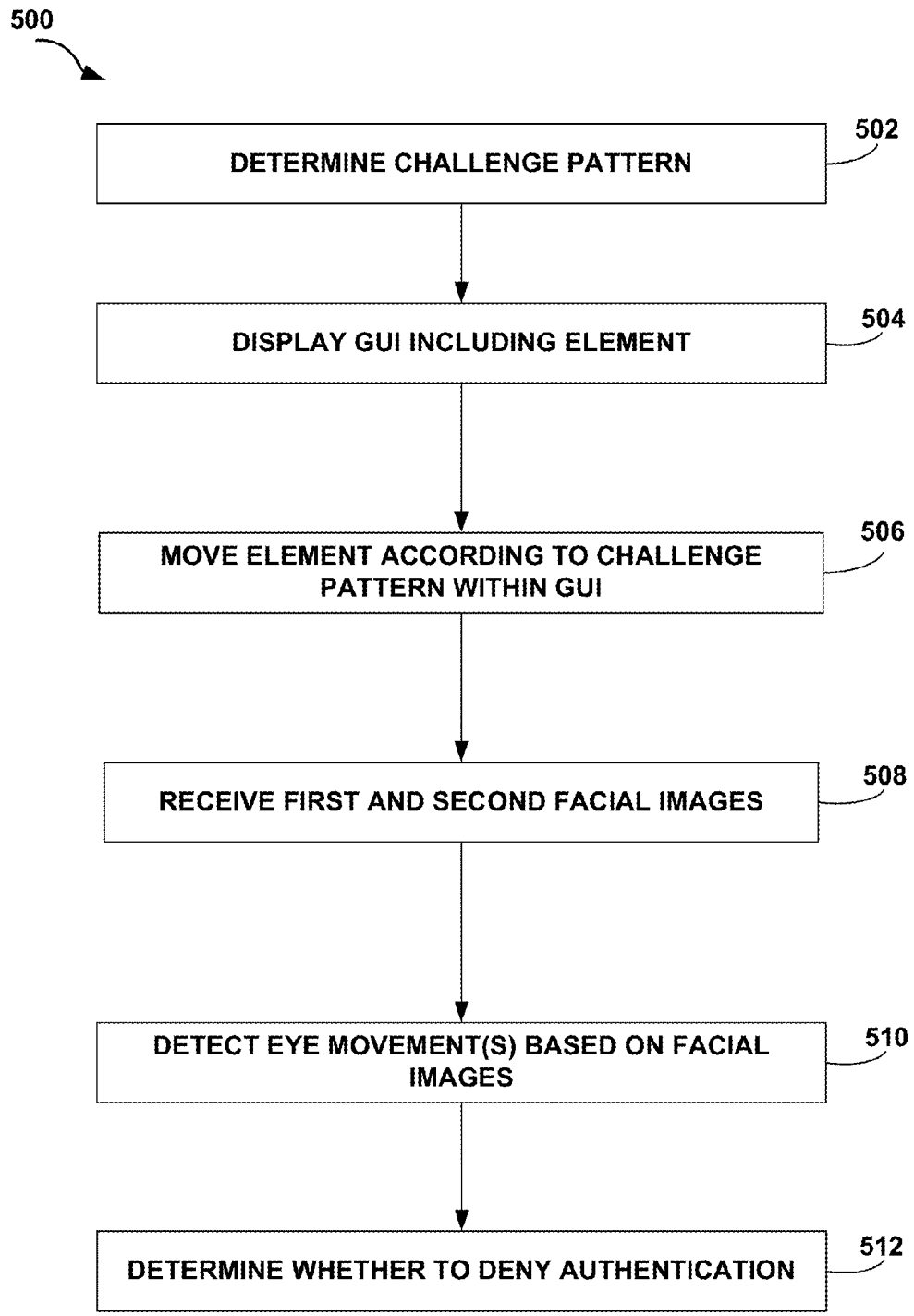
FIG. 5 is a flowchart illustrating an example process by which a computing device may perform one or more anti-spoofing techniques of this disclosure.

FIG. 5 is a flowchart illustrating an example process by which a computing device may perform one or more anti-spoofing techniques of this disclosure. While process 500 of FIG. 5 may be performed by a variety of devices to implement the techniques of this disclosure, for purposes of clarity, process 500 is described with respect to computing device 102 as illustrated in FIG. 2. Process 500 may begin when movement pattern module 8 determines a challenge pattern against which to match an authentication input to detect liveness (502). For example, movement pattern module 8 may generate a random challenge pattern and determine the expected eye movement pattern based on the challenge pattern. Additionally, computing device 102 may display, using a display device (such as UI device 4), a graphical user interface (GUI) including an element (504). An example of an element is a GUI element, such as challenge dot 314, illustrated in FIG. 3A.

Computing device 102 may move the element according to the challenge pattern within the GUI (506). For instance, computing device 102 may move challenge dot 314 along a straight line path, as shown in FIGS. 3A-3B. Eye movement detection module 10 may receive, from an image capture device at least a first image of a face of a user and a second image of the face of the user (508). The image capture device may be, for example, a front-facing video-capable camera of input devices 42. For instance, the first and second images may be separate frames of the captured video data of the user. Additionally, eye movement detection module 10 may detect one or more eye movements based at least in part on the first image of the face of the user and the second image of the face of the user (510). As described, eye movement detection module 10 may detect the eye movements by extracting one or more ocular sub-images from the facial images, and classifying a gaze model associated with each facial image by comparing edges (and, optionally, the respective locations of the edges) within the ocular sub-images.

Additionally, eye movement detection module 10 may determine whether to deny authentication to the user with respect to accessing one or more functionalities controlled by computing device 102 (512). Eye movement detection module 10 may determine whether to deny the authentication independently of results (if any) generated by facial recognition module 6. In other words, eye movement detection module 10 may deny authentication by overriding a positive result generated by facial recognition module 6, may confirm a denial result generated by facial recognition module 6, or may deny authentication prior to (or without any) execution of facial recognition analysis by facial recognition module 6. In some implementations, eye movement detection module 10 may compare the detected eye movement(s) to the expected eye movement pattern determined by movement pattern module 8 for liveness detection purposes (e.g., based on directions and/or speeds of specific eye movements, stoppage times and/or locations), and determine whether to deny authentication based on the comparison.

In some examples, anti-spoofing module 56 may "train" eye movement detection module 10 at a stage of enrollment of an authorized user. For instance, anti-spoofing module 56 may cause movement pattern module 8 to generate a challenge pattern and eye movement detection module 10 to track an enrolling user's eye movements and compare the tracked movements to the challenge pattern. In examples, anti-spoofing module 56 may perform the enrollment in three separate sessions, each session lasting six seconds. At an example frame rate of 15 frames per second, the entire training session may provide a total of 270 frames of captured video. In turn, anti-spoofing module 56 may sample every tenth frame (i.e., extract a total of 27 frames) for training purposes. During the training process, eye movement detection module 10 may detect one or more idiosyncrasies of the user's eye movements, and adjust the gaze-tracking algorithms accordingly. Examples may include peculiarities pertaining to the shape, size, or color of one or both eyes, and of the nature of the user's eye movements. By adjusting the gaze-tracking algorithms, eye movement detection module 10 may permit for user-specific qualities during liveness detection. In the example described above, the enrollment process may utilize 250 kilobytes of video data, and the authentication process may take approximately five seconds.

Eye detection module 10 may flag bad enrollment/trainings by analyzing the Kullback-Liebler divergence among the training points of the captured video. Specifically, eye detection module 10 may compute $$KLDY = E[(2P(Y=1|x)-1)\log(P(Y=1|x)/(1-P(Y=1|x)))]$$

over all training points where E(•) denotes expected value, x denotes feature vector and Y is a classifier. Eye movement detection module 10 may compute class probabilities by taking the normalized mean distance from the training points belonging to the class, i.e., $$P(Y=1|x) = \alpha/(\alpha+\beta), \text{ where } \alpha = [1/\|Y(u)=1\|] \sum_{\forall u|Y(u)=1} d(x,u),$$

and $$\beta = [1/\|Y(u)=0\|] \sum_{\forall u|Y(u)=0} d(x,u),$$

and d(•,•) denotes Euclidean distance. If the illumination during enrollment is low, the user's eyes are closed, or if the user does not follow the challenge dot and simply gazes straight ahead, the training points will have low divergence and vice versa. Eye movement detection module may deem enrollment as successful in those scenarios where the KLD for all the classifiers exceed their respective thresholds.

Figure 6:
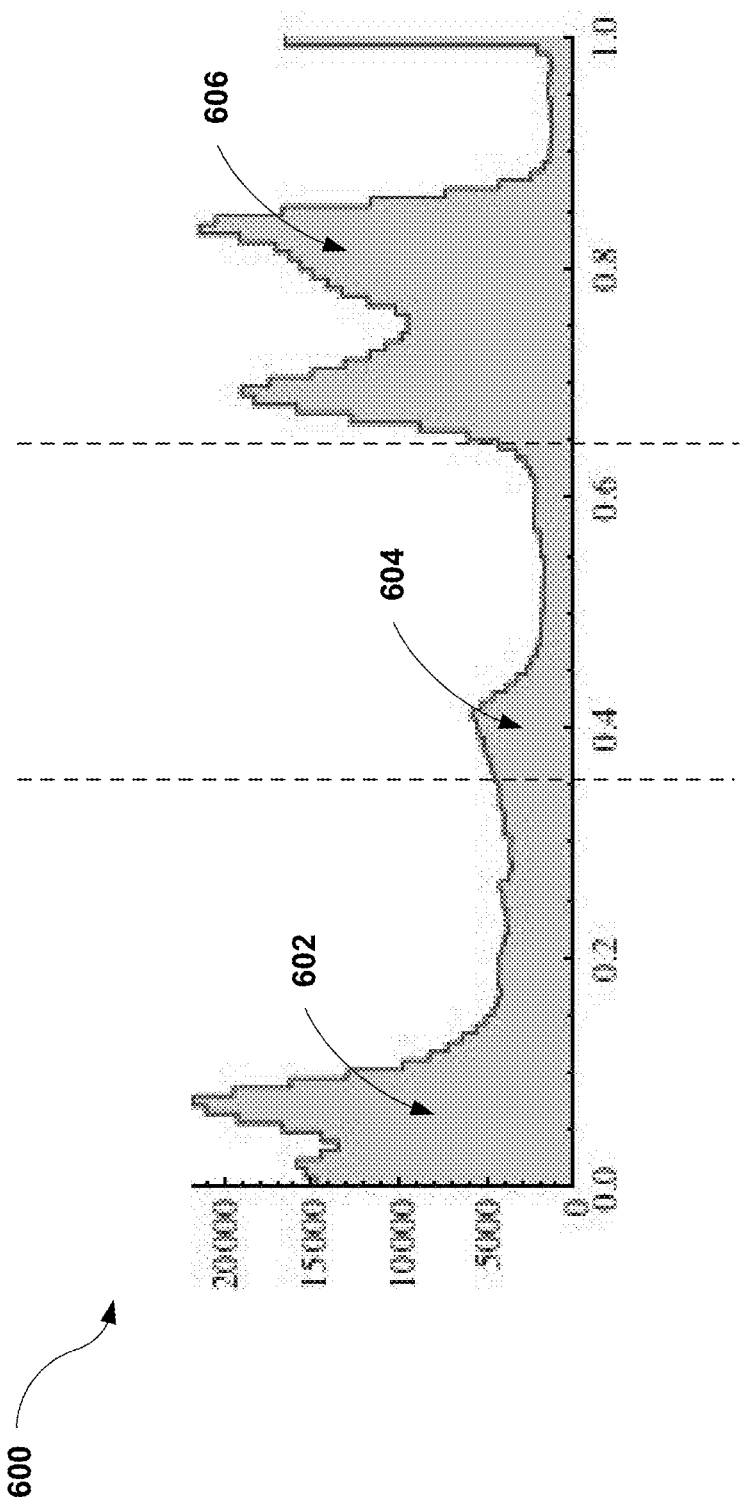
FIG. 6 is an example image histogram illustrating a tonal distribution of an image.

FIG. 6 is an example image histogram illustrating a tonal distribution of an image. In various examples, a histogram of gradients (HoG) described above may be expressed in the form illustrated with respect to image histogram 600. The x-axis (horizontal axis) of histogram 600 represents the tonal values of pixels in the image, and the y-axis (vertical axis) represents the number of pixels in the image that correspond to each tonal value. A tonal value may, in turn, express the darkness of a corresponding pixel. Darker pixels correspond to the left side of the x-axis, and lighter pixels to the right side. In other words, the x-axis of histogram 600 represents a descending level of pixel-darkness.

In the example of FIG. 6, image histogram 600 includes dark region 602 that may represent a total number of dark pixels, intermediate range 604 that may represent a total number of pixels having intermediate darkness, and light region 606 that represents a total number of light pixels in an image, such one or more of ocular sub-images 404 of FIG. 4. As shown, in the example of image histogram 600, dark region 602 and light region 606 may cover comparable areas (and also include a comparable number of peaks), while intermediate region 604 may cover a lesser area (and also include a lesser number of peaks).

The comparable areas of dark region 602 and light region 606 may indicate a sharp contrast (or a high number of sharp edges) in the image represented by image histogram 600. For instance, image histogram 600 may represent a central region of ocular sub-image 404A (which corresponds to a center gaze). More specifically, in this example, the sharp edge(s) indicated by dark region 602 and light region 606 may correspond to the contrast between the iris and the sclera in the central region of ocular sub-image 404A. On the other hand, images histograms representing the left or right portions of ocular sub-image 404A may be skewed towards light region 606, i.e., light region 606 may cover a significantly greater area than dark region 602 and intermediate region 604. As one example, in the case of a left or right portion of ocular sub-image 404A (which largely represent the sclera of the eye), dark region 602 may more closely resemble intermediate region 604 in terms of area covered and, optionally, peak count.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may comprise one or more computer-readable storage media.

In some examples, computer-readable storage media and/or computer-readable storage devices may comprise non-transitory media and/or non-transitory devices. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    determining, by a computing device, a challenge pattern against which to match an authentication input to detect liveness;

displaying, using a display device coupled to the computing device, a graphical user interface including an element;

moving the element according to the challenge pattern within the graphical user interface;

receiving, from an image capture device coupled to the computing device, at least a first image of a face and a second image of the face;

detecting, by the computing device, one or more eye movements based at least in part on the first image of the face and the second image of the face, at least in part by:

detecting, by the computing device, a first set of gradients among a first plurality of subimages extracted from the first image and a second set of gradients among a second plurality of subimages extracted from the second image, each subimage of the first plurality of subimages and the second plurality of subimages including a respective plurality of pixels;

generating, by the computing device, a respective histogram of gradients corresponding to each respective subimage of the first plurality of subimages extracted from the first image and the second plurality of subimages extracted from the second image;

determining, by the computing device, an angle associated with each respective pixel of each respective subimage of the first plurality of subimages and the second plurality of subimages, each determined angle representing a color transition between the respective pixel and a respective adjacent pixel;

based on the determined angle associated with each respective pixel, assigning, by the computing device, a single angle category selected from a plurality of angle categories to each respective pixel; and generating, by the computing device, a plurality of votes associated with each respective histogram of gradients, each vote of the plurality of votes based at least in part on the respective angle category of the corresponding histogram of gradients; and determining, by the computing device, whether to deny authentication with respect to accessing one or more functionalities controlled by the computing device, based at least in part on the detected one or more eye movements.

2. The method of claim 1, wherein the element comprises a dot, and wherein moving the element further comprises:

moving the dot along a straight line path within the displayed graphical user interface.

3. The method of claim 2, wherein the straight line path is positioned parallel to a horizontal edge of the graphical user interface.

4. The method of claim 1, wherein detecting the eye movement further comprises:

dividing, by the computing device, the first image of the face to extract the first plurality of subimages; and dividing, by the computing device, the second image of the face to extract the second plurality of subimages.

5. The method of claim 1, wherein assigning the single angle category to each respective pixel comprises:

determining, by the computing device, that each respective angle category of the plurality of angle categories corresponds to a range of angular values between 0 and 180 degrees.

6. The method of claim 5, wherein each respective vote of the plurality of votes is based at least in part on a corresponding angle category of the respective histogram of gradients.

7. The method of claim 1, further comprising:

extracting, by the computing device, from the first image and the second image of the face, a first ocular sub-image and a second ocular sub-image, respectively, wherein the first plurality of sub-images and the second plurality of sub-images comprise a plurality of segments of the first ocular sub-image and a plurality of segments of the second ocular sub-image, respectively.

8. The method of claim 1, wherein the image capture device has video capture capabilities, and wherein at least one of the first image and the second image form a portion of video data received from the image capture device.

9. The method of claim 1, further comprising:

performing, by the computing device, facial recognition analysis on each of the first image and the second image;

responsive to determining that at least one of the first image and second image fail the facial recognition analysis, denying, by the computing device, authentication with respect to accessing one or more functionalities controlled by the computing device; and responsive to determining that both of the first image and the second image pass the facial recognition analysis and the facial gesture is detected, granting, by the computing device, authentication with respect to accessing one or more functionalities controlled by the computing device.

10. The method of claim 1, wherein receiving the first image and the second image further comprises selecting, by the computing device, the first image and the second image from a plurality of images that includes at least the first image, the second image, and a third image.

11. The method of claim 10, wherein selecting the first image and the second image from the plurality of images comprises selecting, by the computing device, the first image and the second image based at least in part on the detected eye movement.

12. The method of claim 1, further comprising:

prior to detecting the one or more eye movements, granting, by the computing device and to one or both of the first image and the second image, a match by facial recognition.

13. The method of claim 1, further classifying, by the computing device, each of the first image of the face and the second image of the face as one of a center-gazing facial image, a right-gazing facial image, and a left-gazing facial image; and comparing, by the computing device, the detected one or more eye movements to the challenge pattern at least in part by comparing the first image of the face and the second image of the face to a first gaze classification and a second gaze classification associated with the challenge pattern.

14. The method of claim 1, further comprising detecting, by the computing device, one or more of a speed, a stoppage time, and a stoppage location associated with at least one eye movement of the one or more detected eye movements; and comparing, by the computing device, the detected one or more eye movements to the challenge pattern at least in part by comparing the detected one or more of the speed, the stoppage time, and the stoppage location to one or more of a corresponding speed, a corresponding stoppage time, and a corresponding stoppage location associated with the challenge pattern.

15. The method of claim 1, further comprising:
comparing, by the computing device, the detected one or more eye movements to the challenge pattern at least in part by detecting, by the computing device, that the detected one or more eye movements differ from one or more expected eye movements associated with the challenge pattern.

16. The method of claim 15, wherein determining whether to deny authentication comprises:
determining, by the computing device, whether a difference between the detected one or more eye movements and the one or more expected eye movements is within a predetermined margin of error.

17. A computer-readable storage device encoded with instructions that, when executed, cause one or more programmable processors of a computing device to perform operations comprising:
determining a challenge pattern against which to match an authentication input to detect liveness;
displaying, using a display device coupled to the computing device, a graphical user interface including an element;
moving the element according to the challenge pattern within the graphical user interface;
receiving, from an image capture device coupled to the computing device, at least a first image of a face and a second image of the face;
detecting one or more eye movements based at least in part on the first image of the face and the second image of the face, at least in part by:
detecting a first set of gradients among a first plurality of subimages extracted from the first image and a second set of gradients among a second plurality of subimages extracted from the second image, each subimage of the first plurality of subimages and the second plurality of subimages including a respective plurality of pixels;
generating, by the computing device, a respective histogram of gradients corresponding to each respective subimage of the first plurality of subimages extracted from the first image and the second plurality of subimages extracted from the second image;
determining an angle associated with each respective pixel of each respective subimage of the first plurality of subimages and the second plurality of subimages, each determined angle representing a color transition between the respective pixel and a respective adjacent pixel;
based on the determined angle associated with each respective pixel, assigning a single angle category selected from a plurality of angle categories to each respective pixel; and
generating, by the computing device, a plurality of votes associated with each respective histogram of gradients;
and
determining whether to deny authentication with respect to accessing one or more functionalities controlled by the computing device, based at least in part on the detected one or more eye movements.

18. A computing device comprising:
a memory; and
one or more processors configured to:
determine a challenge pattern against which to match an authentication input to detect liveness;
display, at a display device coupled to the computing device, a graphical user interface including an element;
move the element according to the challenge pattern within the graphical user interface;
receive, from an image capture device coupled to the computing device, at least a first image of a face and a second image of the face;
detect one or more eye movements based at least in part on the first image of the face and the second image of the face, wherein to detect the one or more eye movements, the one or more processors are configured to:
detect a first set of gradients among a first plurality of subimages extracted from the first image and a second set of gradients among a second plurality of subimages extracted from the second image, each subimage of the first plurality of subimages and the second plurality of subimages including a respective plurality of pixels;
generate a respective histogram of gradients corresponding to each respective subimage of the first plurality of subimages extracted from the first image and the second plurality of subimages extracted from the second image;
determine an angle associated with each respective pixel of each respective subimage of the first plurality of subimages and the second plurality of subimages, each determined angle representing a color transition between the respective pixel and a respective adjacent pixel;
based on the determined angle associated with each respective pixel, assign a single angle category selected from a plurality of angle categories to each respective pixel; and
generate a plurality of votes associated with each respective histogram of gradients;
and
determine whether to deny authentication with respect to accessing one or more functionalities controlled by the computing device, based at least in part on the detected one or more eye movements.

19. A method comprising:
determining, by a computing device, a challenge pattern against which to match an authentication input to detect liveness;
displaying, using a display device coupled to the computing device, a graphical user interface that includes an element;
displaying the graphical user interface such that the element moves according to the challenge pattern within the graphical user interface;
receiving, by the computing device, from an image capture device coupled to the computing device, at least a first image of a face and a second image of the face;
detecting, by the computing device, one or more eye movements based at least in part on the first image of the face and the second image of the face, at least in part by:
detecting, by the computing device, a first set of gradients among a first plurality of subimages extracted from the first image and a second set of gradients among a second plurality of subimages extracted from the second image, each subimage of the first plurality of subimages and the second plurality of subimages including a respective plurality of pixels;
generating, by the computing device, a respective histogram of gradients corresponding to each respective subimage of the first plurality of subimages extracted from the first image and the second plurality of subimages extracted from the second image;

determining, by the computing device, an angle associated with each respective pixel of each respective subimage of the first plurality of subimages and the second plurality of subimages, each determined angle representing a color transition between the respective pixel and a respective adjacent pixel;

based on the determined angle associated with each respective pixel, assigning, by the computing device, a single angle category selected from a plurality of angle categories to each respective pixel; and generating, by the computing device, a plurality of votes associated with each respective histogram of gradients;

comparing, by the computing device, the detected one or more eye movements to the challenge pattern based at least in part on the plurality of votes associated with each respective histogram of gradients for the first image of the face and the second image of the face; and determining, based at least in part on the comparison, whether to deny authentication with respect to accessing one or more functionalities controlled by the computing device.

\* \* \* \* \*